(12) United States Patent
Brisk et al.

(10) Patent No.: US 8,667,046 B2
(45) Date of Patent: Mar. 4, 2014

(54) GENERALIZED PROGRAMMABLE COUNTER ARRAYS

(75) Inventors: Philip Brisk, Ecublens (CH);
Alessandro Cevrero, Lausanne (CH);
Frank K. Gurkaynak, Zurich (CH);
Paolo Ienne Lopez, Pully (CH); Hadi Parandeh-Afshar, Chavannes-Renens (CH)

(73) Assignee: Ecole Polytechnique Federale de Lausanne/Service des Relations Industrielles (CH)

( * ) Notice: Subject to any disclaimer, the term of this patent is extended or adjusted under 35 U.S.C. 154(b) by 1077 days.

(21) Appl. No.: 12/389,889

(22) Filed: Feb. 20, 2009

(65) Prior Publication Data

US 2009/0216826 A1 Aug. 27, 2009

Related U.S. Application Data

(60) Provisional application No. 61/030,260, filed on Feb. 21, 2008.

(51) Int. Cl.
*G06F 7/38* (2006.01)
*G06F 7/00* (2006.01)
*G06F 7/52* (2006.01)
*G06F 7/50* (2006.01)

(52) U.S. Cl.
USPC ........... 708/700; 708/490; 708/518; 708/523; 708/625; 708/626; 708/670

(58) Field of Classification Search
USPC ........ 708/490, 492, 518, 625–626, 670, 525, 708/628, 523, 700
See application file for complete search history.

(56) References Cited

U.S. PATENT DOCUMENTS

| | | | | |
|---|---|---|---|---|
| 3,795,880 A * | 3/1974 | Singh et al. | ................... | 708/626 |
| 5,956,263 A * | 9/1999 | Narita et al. | .................. | 708/525 |
| 6,167,421 A * | 12/2000 | Meeker et al. | ................ | 708/626 |
| 6,408,320 B1 * | 6/2002 | Shiell | ............................. | 708/518 |
| 6,618,741 B2 * | 9/2003 | Carroll | ........................... | 708/490 |
| 6,671,709 B2 * | 12/2003 | Glaser et al. | .................. | 708/492 |
| 7,233,265 B2 * | 6/2007 | Cockburn et al. | ............... | 341/51 |
| 7,266,580 B2 * | 9/2007 | Busaba et al. | ................ | 708/625 |
| 7,308,471 B2 * | 12/2007 | Rumynin | ...................... | 708/628 |
| 2002/0196936 A1 * | 12/2002 | Hepler | ............................ | 380/46 |
| 2005/0187998 A1 * | 8/2005 | Zheng et al. | .................. | 708/523 |

* cited by examiner

*Primary Examiner* — Farley Abad
*Assistant Examiner* — Henry Yu
(74) *Attorney, Agent, or Firm* — Seyfarth Shaw LLP; Brian Michaelis (57) ABSTRACT

A Generalized Programmable Counter Array (GPCA) is a reconfigurable multi-operand adder, which can be reprogrammed to sum a plurality of operands of arbitrary size. The GPCA is configured to compress the input words down to two operands using parallel counters. Resulting operands are then summed using a standard Ripple Carry Adder to produce the final result. The GPCA consists of a linear arrangement of identical compressor slices (CSlice).

18 Claims, 10 Drawing Sheets

FIG. 3
EXAMPLE: 16-INPUT CSLICE

FIG. 4
P-INPUT COMPRESSOR SLICE (P-CSLICE)

FIG. 7
COMPRESSOR TREE

FIG. 8
CONFIGURABLE CARRY-SELECT ADDER (CPA)

FIG. 9
RANK 1 CONFIGURATION

FIG. 10
RANK 2 CONFIGURATION

GENERALIZED PROGRAMMABLE COUNTER ARRAYS

FIELD OF THE INVENTION

The present invention relates to programmable logic devices.

BACKGROUND OF THE INVENTION

Application Specific Integrated Circuits (ASICs) are designed to provide adequate performance for specific applications that could otherwise not be provided by a traditional processor and software. However, ASIC design costs and complexity increase exponentially with each new generation, while the products that use them drop in price at equally astonishing rates. Field Programmable Gate Arrays (FPGAs) offer many advantages compared to ASICs, including reduced non-recurring engineering costs, post-deployment reconfigurablity, and reduced time-to-market. The resulting circuit, however, will be slower, consume more power, and utilize significantly more silicon resources than its ASIC equivalent. These gaps are significant, but tolerable, for finite state machines and control-dominated applications, but become more pronounced for arithmetic-dominated applications such as video coding, Finite Impulse Response (FIR) filters, and 3G wireless base station channel cards.

To improve arithmetic performance, several researchers proposed carry chains that could efficiently embed circuitry that could perform fast addition inside a series of adjacent logic blocks. Commercial vendors have adopted carry chains in various heretofore known devices. For example, the Xilinx Virtex-4/5 CLBs available from Xilinx Inc. of San Jose, Calif., can send propagate/generate signals to adjacent blocks.

The Altera Stratix II/III/IV Adaptive Logic Modules (ALMs) implement ripple-carry addition. In the Stratix II ALM device, Altera Corporation of San Jose, Calif. introduced support for ternary, addition using the carry-chains. The Look-Up Tables (LUTs) act as carry-save adders (3:2 compressors), and the carry chain adds the result. This structure has been retained in the Stratix III and IV devices, which have followed.

Many other academic groups have also proposed carry chains for a variety of adder architectures. See, e.g., Cherepacha, D., and Lewis, D. DP-FPGA: an FPGA architecture optimized for datapaths, VLSI Design vol. 4, no. 4, 1996, 329-343; Frederick, M. T., and Somani, A. K. Multi-bit carry chains for high performance reconfigurable fabrics. International Conference on Field Programmable Logic and Applications (FPL '06) (Madrid, Spain, Aug. 28-30, 2006) 1-6; Hauck, S., Hosler, M. M., and Fry, T. W. High-performance carry chains for FPGAs, IEEE Transactions on VLSI Systems, vol. 8, 138-147; Kaviani, A., Vranisec, D., and Brown, S. Computational field programmable architecture. IEEE Custom Integrated Circuits Conference (CICC '98) (Santa Clara, Calif., USA, May 11-14, 1998) 261-264; and Leijten-Nowak, K., and Van Meerbergen, J. L. An FPGA architecture with enhanced datapath functionality. International Symposium on FPGA (FPGA '03) (Monterey, Calif., USA, Feb. 23-25, 2003) 195-204.

Hard intellectual property (IP) cores, e.g., digital signal processor/multiplier-accumulator (DSP/MAC) blocks, have heretofore been embedded into FPGAs. See Zuchowski, P. S., Reynolds, C. B., Grupp, R. J., Davis, S. G., Cremen, B., and Troxel, B. A hybrid ASIC and FPGA architecture, Int. Conf. Computer-Aided Design (ICCAD '02) (San Jose, Calif., USA, Nov. 10-14, 2002) 187-194. However, it has been recognized that the benefits of IP cores could be lost due to mismatches in bit-width. See, Kuon, I., and Rose, J. Measuring the gap between FPGAs and ASICs. IEEE Trans. Computer-Aided Design, vol. 26, no. 2, February, 2007, 203-215.

SUMMARY OF THE INVENTION

The current invention defines a new class of reprogrammable multi-operand adders to address the performance of arithmetic-dominated applications. It is foreseen that these circuits can be implemented in a variety of technologies and be combined, added or included in a variety of architectures which included, but not limited to, FPGAs.

The input to such a device is a set of binary integers to sum. Let $B = b_{k-1} b_{k-2} \ldots b_0$ be a k-bit integer, where each $b_i$ is an individual bit. $b_i$ may be a constant (0 or 1) determined statically, or its value may vary, known only at runtime. $b_0$ is the least significant bit, and $b_{k-1}$ is the most significant bit. The subscript of bit $b_i$ is called the rank; $b_i$ contributes an overall value of $b_i 2^i$ to the overall value of B.

Given a set of integers to add, a column is defined to contain all of the bits of the same rank, i.e., up to one bit per integer. For the purposes of the GPCA, the inputs can be viewed as columns of bits, rather than rows of integers. In the general case, if the input is comprised of n integers, each having a bitwidth of k, then the input is equivalently a set of k columns, of rank 0 through k−1, where each column contains n bits.

An illustrative embodiment of the invention includes a device for adding multiple columns. The device includes a plurality of parallel counters wherein each parallel counter receives bits from one or more adjacent columns. The parallel counters are arranged to compress the multi-bit operands into a pair of resulting operands. Electrical wires interconnect the parallel counters. An input configuration circuit is adapted to zero selected bits of at least one of the multi-bit operands to effect a summation of a subset of the multiple columns and a subset of bits within the columns. An adder receives the resulting operands and provides an adder output including a sum of the resulting operands.

Illustrative embodiments of the invention include configuration circuitry in communication with the output multiplexer. The configuration circuitry is adapted to connect the device in a chain with other identical or similar devices.

Another illustrative embodiment of the invention provides a device for adding multiple columns of multi-bit operands. The device includes means for compressing the multi-bit operands into a pair of resulting operands, means for zeroing selected bits of at least one of the multi-bit operands to effect a summation of a subset of the multiple columns and a subset of bits within the columns, and means for receiving the resulting operands and providing an adder output including a sum of the resulting operands. The illustrative embodiment can also include means for selecting the columns; and means for selecting which bits of the selected columns are to be added.

In another illustrative embodiment, the present invention provides a method for adding multiple columns of multi-bit operands. The method includes selecting columns of the multi-bit operands to be added and providing configuration circuitry to selectively configure a plurality of parallel counters to combine only the selected columns. The method generally includes the steps of zeroing selected bits of the multi-bit operands to enable a summation of a subset of the multiple columns and a subset of bits within the columns, compressing the multi-bit operands into a pair of resulting operands, adding the resulting operands to generate an intermediate result, compressing the intermediate result in parallel counter columns having multiple counter sizes corresponding to a desired output rank, and multiplexing the compressed intermediate results.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

A Generalized Programmable Counter Array (GPCA) is a reconfigurable multi-operand adder, which can be reprogrammed to sum a plurality of operands of arbitrary size. The GPCA compresses the input words down to two operands using parallel counters. The resulting operands are then summed using a Ripple Carry Adder to produce the final result.

Figure 1:
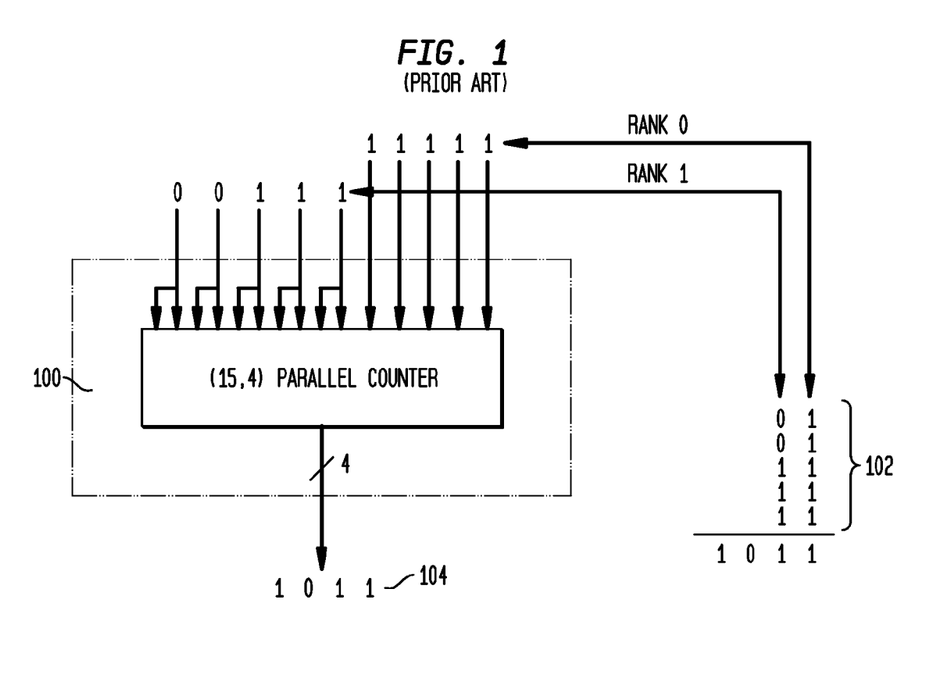
FIG. 1 is a schematic diagram of a general parallel counter (GPC) according to the prior art.

A specific realization of a GPCA uses general parallel counters of different sizes and wires to connect them within a GPCA. FIG. 1 shows an example of a general parallel counter GPC 100 configured to add five 2 bit numbers 102 and generate a four bit sum 104 as known in the art.

Figure 2:
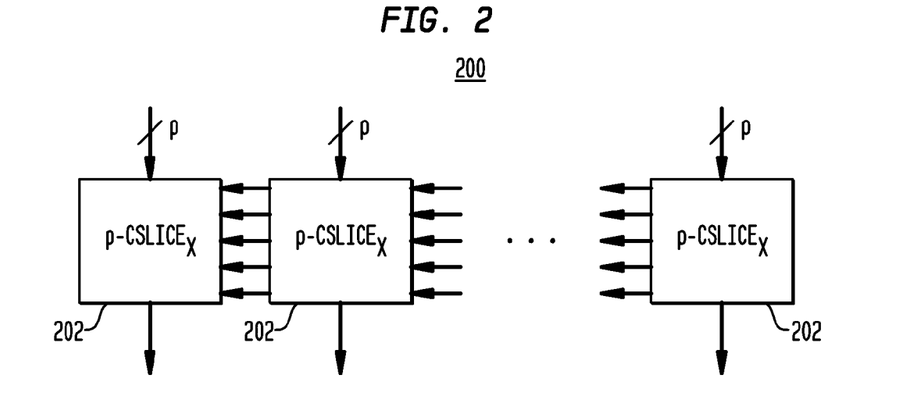
FIG. 2 is a schematic diagram of a generalized programmable counter array (GPCA) according to an illustrative embodiment of the present invention.

A GPCA 200 according to an illustrative embodiment is shown in FIG. 2. The GPCA 200 includes a linear arrangement of identical Compressor Slices 202 (CSlice).

Figure 3:
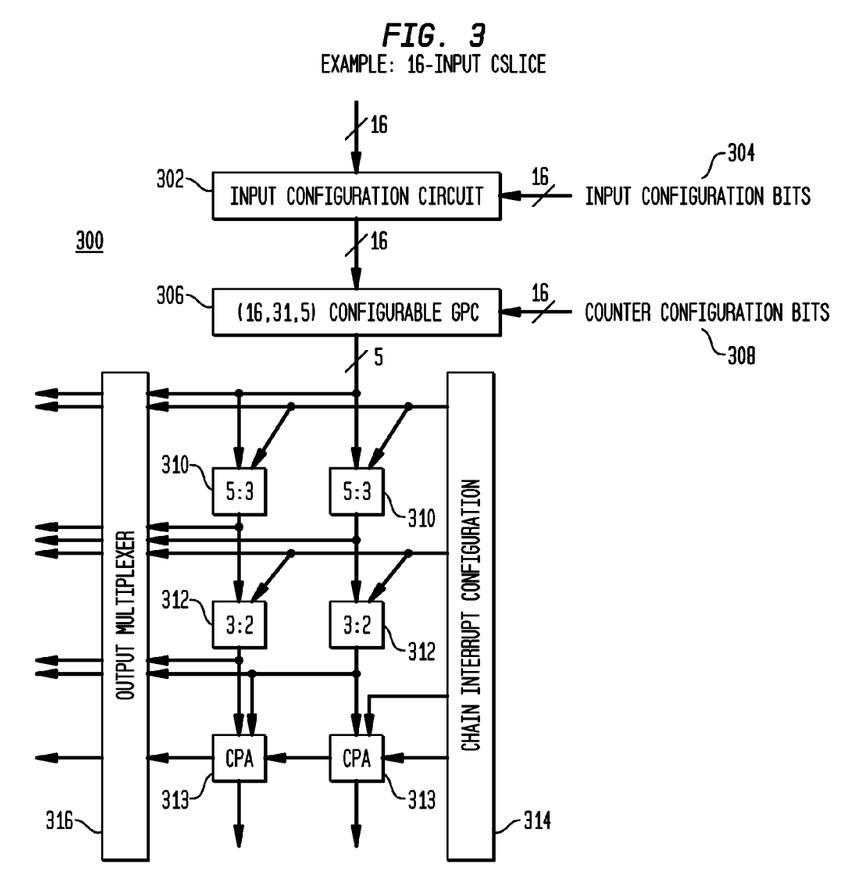
FIG. 3 is a schematic diagram of a 16 input compressor slice (CSlise) according to an illustrative embodiment of the present invention.

FIG. 3 shows an illustrative embodiment of a CSlice 300. The illustrative CSlice 300 includes an input configurable circuit (ICC) 302 which receives input configuration bits 304. The ICC 302 is connected to a configurable general parallel counter (CGPC) 306 which receives counter configuration bits 308. The CGPC 306 is connected to a column of GPCs 310, 312 of different size for each rank accepted by the CSlice 300. The GPC size is shown by the number of input bits to the GPC and the number of output bits from the GPC. For example, GPCs 310 are 5:3 counters which means they can receive five bits and output three bits. GPCs 312 are 3:2 counters which receive 3 input bits and output two bits. A last GPC of each column is connected to a configurable carry-select adder (CPA) 313.

The columns of GPCs are connected on an input side to a Chain Interrupt Configuration 314 and on an output side to an Output Multiplexer 316.

The Input Configuration Circuit (ICC) 302 is used to define which input bits are used in the sum, the ICC allows any of the inputs to take the logical value '0' regardless of their actual value, thus eliminating that input from the sum. Subsequent to the ICC 302, the Configurable GPC 306 enables the inputs to be interpreted as coming from different columns. The combination of the ICC 302 and CGPC 306 enable the CSlice 300 to be configured to sum together different columns and different sets of bits from within the given columns.

The CSlice according to the invention has been designed to accept data-bits which could belong to different columns, where a column is the position of the bit in the input operand. Therefore it requires a Generalized Parallel Counter, which processes the data "filtered" by the Input Configuration Circuitry. The CSlice can be reprogrammed to support different combinations of GPC with defined I/O constraints. It should be appreciated that such a module could be implemented using a GPC configuration network followed by a single column parallel counter. A Single Column (m:n) Counter is, generally, a circuit that takes m input bits, counts the number of bits that are set to 1, and produces the sum as an n bit value. In adder design, 2:2 and 3:2 counters are called half and full adders respectively; a parallel array of disconnected 3:2 counters can be referred to as a Carry-Save Adder (CSA). For a fixed value of m, the number of output bits required is:

$$n = \lceil \log_2(m+1) \rceil \quad (1)$$

Each CSlice could compress bits belonging to several columns due to the presence of the GPC, and is also capable of producing one or more bits of the final result.

Figure 4:
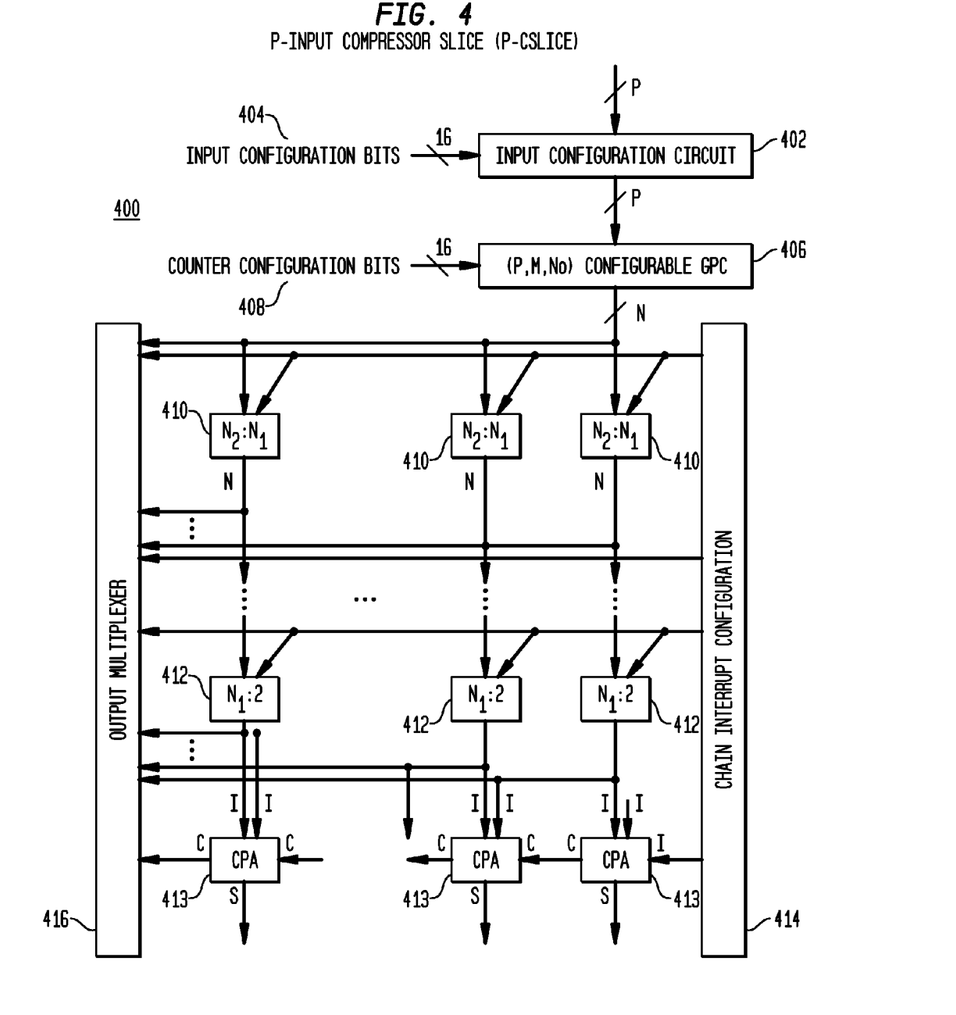
FIG. 4 is a schematic diagram of a P-input CSlise (P-CSlise) according to an illustrative embodiment of the invention.

A more generalized CSlice is referred to as a p-CSlice which is a CSlice with p input bits that can accept data-bits belonging to different columns, where the sum of bits of the chosen column cannot exceed p. A p-CSlice according to an illustrative embodiment of the invention is described with reference to FIG. 4. The illustrative p-CSlice 400 includes an input configurable circuit (ICC) 402 which receives input configuration bits 404. The ICC 402 is connected to a configurable general parallel counter (CGPC) 406 which receives counter configuration bits 408. The CGPC 406 is connected to a column of GPCs 410, 412 of different size for each column accepted by the CSlice 400. A last GPC of each column is connected to a configurable carry-select adder (CPA) 413. The columns of GPCs are connected on an input side to a Chain Interrupt Configuration 414 and on an output side to an Output Multiplexer 416.

Each input of a CSlice (FIG. 3) or a p-CSlice (FIG. 4) first goes through the Input Configuration Circuitry (ICC). An ICC according to an illustrative embodiment of the invention is described with reference to FIG. 5. The ICC 500 is a combinational circuit with p input bits 502 and p output bits 504. The ICC 500 includes a p-bit register called the Input Configuration Register (ICR) 506 and p 2-input AND gates 508. Each input bit is pair-wise combined with its corresponding bit of the ICR 506 via an AND gate 508. In this way if a bit of the ICR 506 is '0' then the output of the AND gate will be '0' irrespective of the value of the corresponding input bit. However, if a bit of the ICR 506 is '1' then the output of the AND gate will be the value of the corresponding input bit. In this way the ICC 500 is able to set any of the p inputs of the p-CSlice (or CSlice) to '0'.

Figure 5:
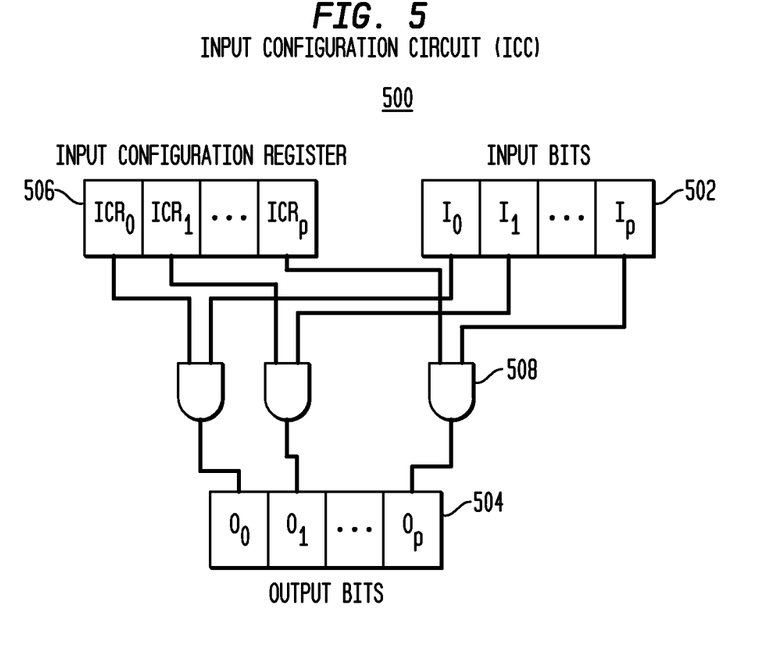
FIG. 5 is a schematic diagram of an input configuration circuit (ICC) according to an illustrative embodiment of the invention.

The output bits 504 from the ICC 500 are input to a Configurable Generalized Parallel Counter (CGPC). The presence of the Configurable Generalized Parallel Counter (CGPC), enables a CSlice to cover multiple columns. The CGPC provides a configuration means that enables the CGPC to implement different GPCs with the same circuit.

An m-input Generalized Parallel Counter (GPC) is generally an extension of an m:n counter that can count input bits of multiple columns. A GPC is specified as a tuple: G=$(m_{k-1}, \ldots, m_0; n)$, where the counter takes $m_i$ inputs of rank i, $0 \le i \le k-1$, and sums them; otherwise, the functionality of a GPC is the same as that of an m:n counter c.

Let M=$m_0 + \ldots + m_{k-1}$ be the number of GPC inputs. In an FPCA, the size of the GPC is limited by M, which we will assume to be fixed. Let $b_i$ be a bit of rank i. An m:n counter can count $b_i$ by connecting it to $2^i$ inputs. An m:n counter can implement the functionality of an M-bit GPC g, provided that:

$$m \ge \sum_{i=0}^{k-1} m_i 2^i \quad (2)$$

An illustrative embodiment of a CGPC according to the present invention is described with reference to FIG. 6, in which P is the number of inputs of the CGPC. The maximum number of columns that can be spanned by the CGPC is called the Input Rank. Once these elements and the parameter (m:n) of the single column counter are defined, the maximum number of GPCs supported by the CGPC can be computed. In the embodiment shown in FIG. 6, P=16; Input Rank=2 and the parameter (31:5) represents the single column counter.

Figure 6:
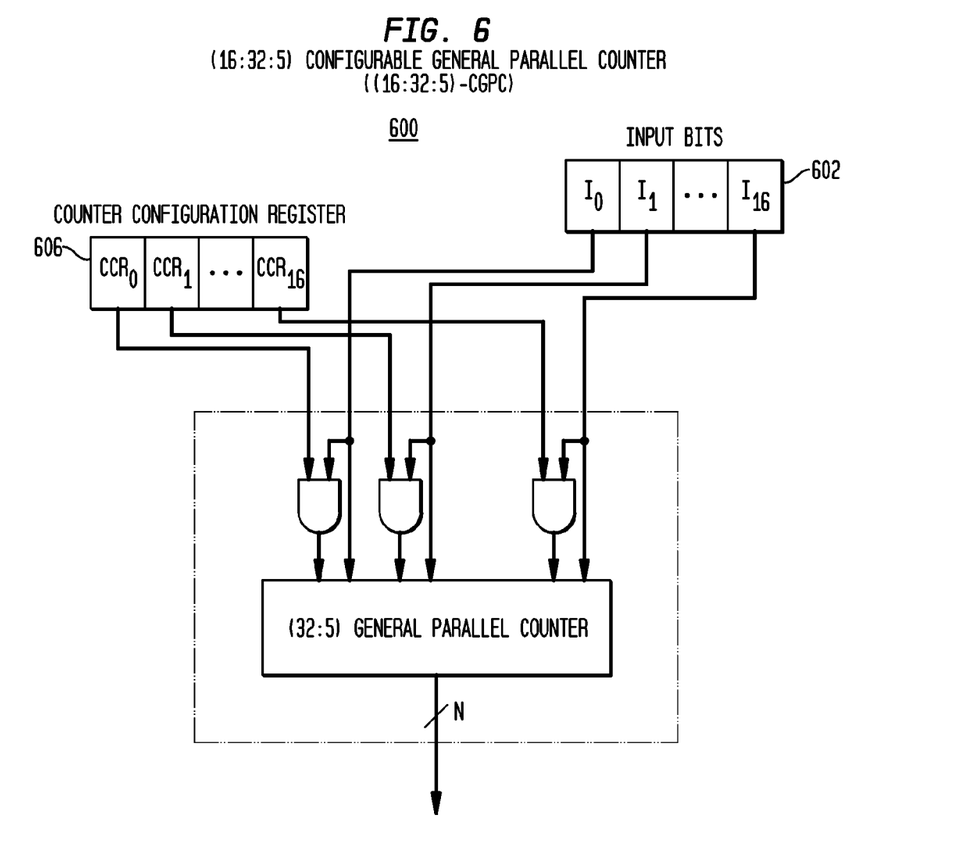
FIG. 6 is a schematic diagram of a configurable general parallel counter (CGPC) according to an illustrative embodiment of the invention.

Illustratively, the (16:31:5) CGPC 600 of FIG. 6 can be programmed to support 16 different GPCs. In this embodiment, the CGPC spans two columns. Each Input-bit 602 belonging to the Least Significant Bit (LSB) column is connected directly to one single column counter input, while each bit belonging to the LSB column is connected to 2 counter inputs since it has weight 2 to the power 1 (i.e., 2). Note that each CGPC input is fed to the (31,5) counter and can be duplicated (if belonging to MSB column) asserting the value of the memory cell. Such a circuit requires a 16-bit Counter Configuration Register (CCR) 606. The possible combinations supported by the CGPC include the maximum output value (represented as a 5 bit unsigned number) for each of the GPCs.

An (p:m:n)-CGPC could compress a plurality of input bits down to n bits (each of them having different ranks). The intermediate results are further compressed up to a level where bits of the final output results are generated. This is accomplished by a set of different counters of suitable size. If the CSlice has an output rank greater than one, several Counters Columns are required.

Each CSlice has the capability to compute one or more bits of the final result, thus each CSlice operates at word level rather than at bit level. In the GPCA architecture each CSlice is formed by a CGPC preceded by the Input Configuration Circuitry, while the remaining part of a compressor tree and a Carry Propagate Adder Slice are repeated several times to allow the computation of multiple sum bits within a slice.

Figure 7:
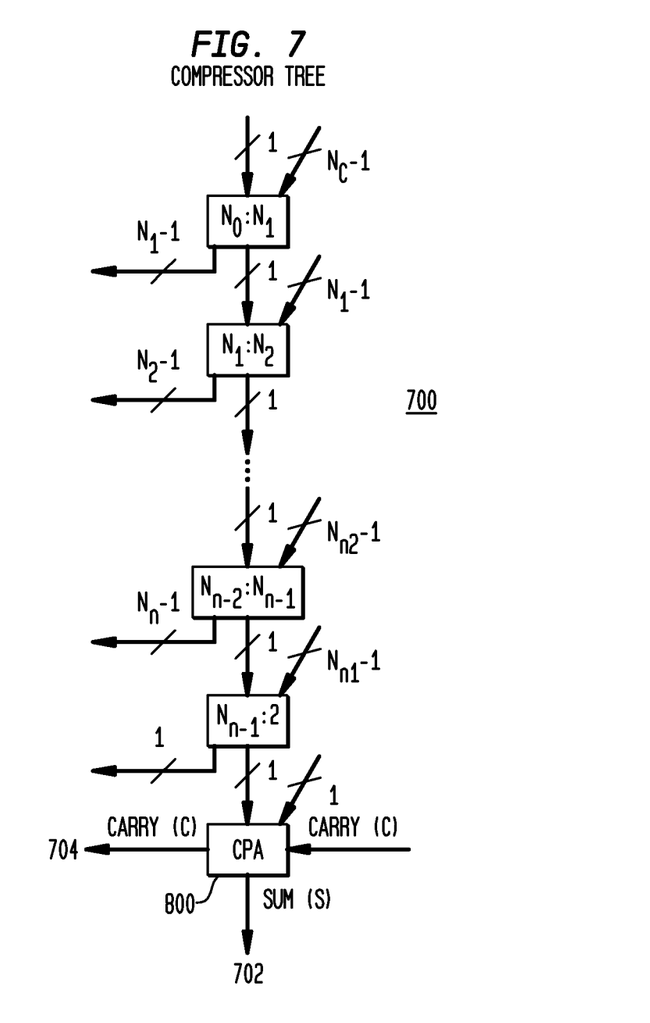
FIG. 7 is a schematic diagram of a compressor tree according to an illustrative embodiment of the invention.
Figure 8:
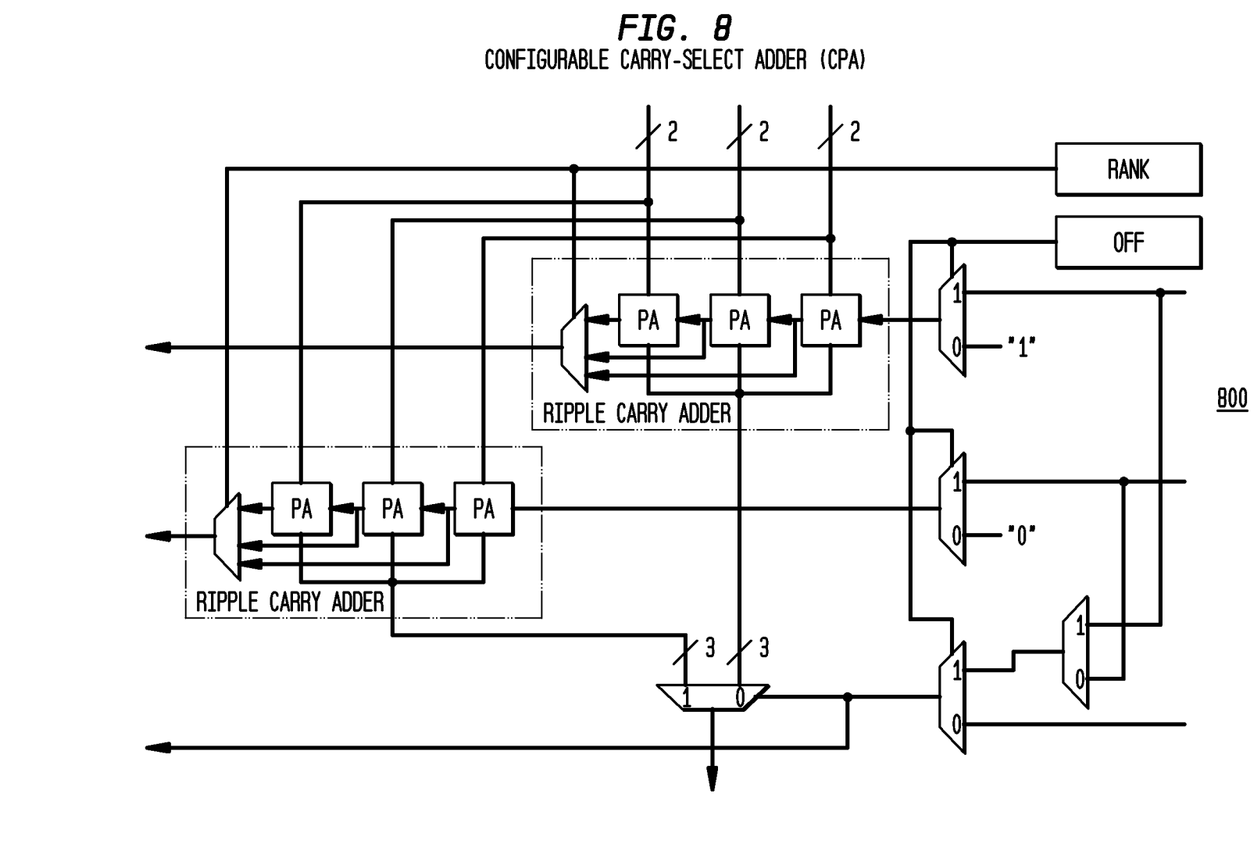
FIG. 8 is a schematic diagram of a configurable carry-select adder (CPA) according to an illustrative embodiment of the invention.

A compressor tree, illustrated in FIG. 7, is generally a circuit 700 that adds k>2 n-bit binary integers, $A_0, \ldots, A_{k-1}$, where Ai=$(a_{i,n-1}, \ldots, a_i, 0)$, for $0 \le i \le k$. The critical path delay of a compressor tree is much less than the delay of an adder tree, built from Carry-Propagate Adders (CPAs). To compute the result, a compressor tree 700 (FIG. 7) produces values, Sum (S) 702 and Carry (C) 704, where the final sum, S+C is computed by a CPA 800 as illustrated in FIG. 8:

$$S + C = \sum_{i=0}^{k-1} A_i. \quad (3)$$

The rank of a bit is its subscript index describing its position in the integer, e.g., bit $a_{i,r}$ has rank r. The Least Significant Bit (LSB) has rank 0 and the Most Significant Bit (MSB) has rank k−1. Bit air of rank r represents quantity $a_{i,r} \times 2^r$. A column Cr=$\{a_{0,r}, \ldots, a_{k-1}, r\}$ is the set of input bits of rank r. The input to a compressor tree can be viewed as a set of columns, rather than integers.

Figure 9:
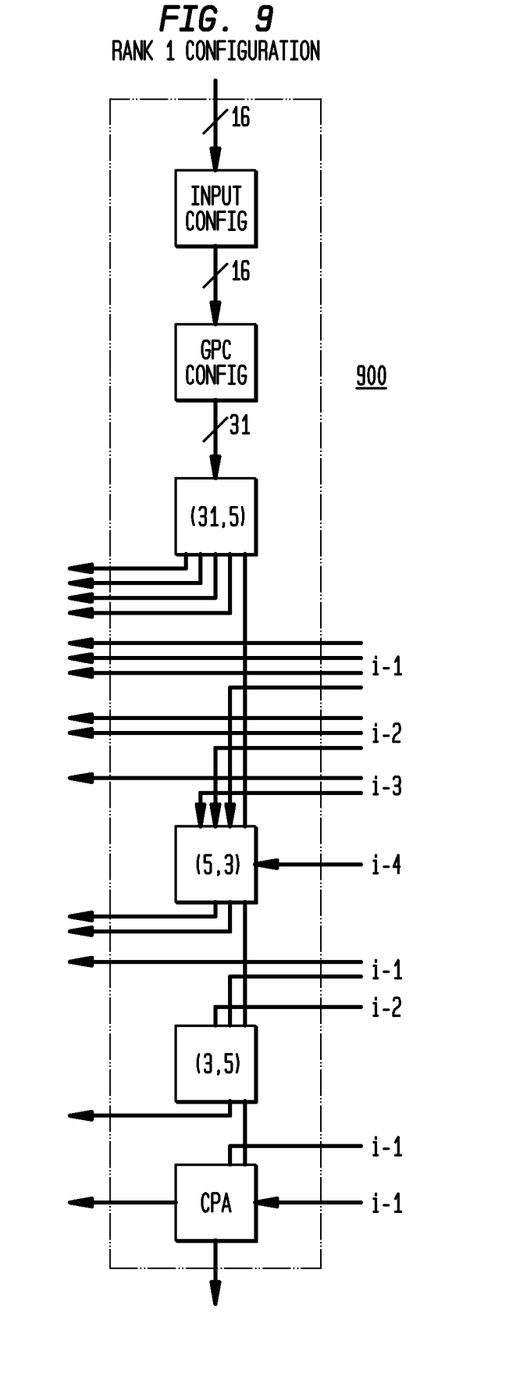
FIG. 9 is a schematic diagram illustrating an example of a CSlice which could be programmed to implement a rank 1 configuration according to an illustrative embodiment of the present invention.
Figure 10:
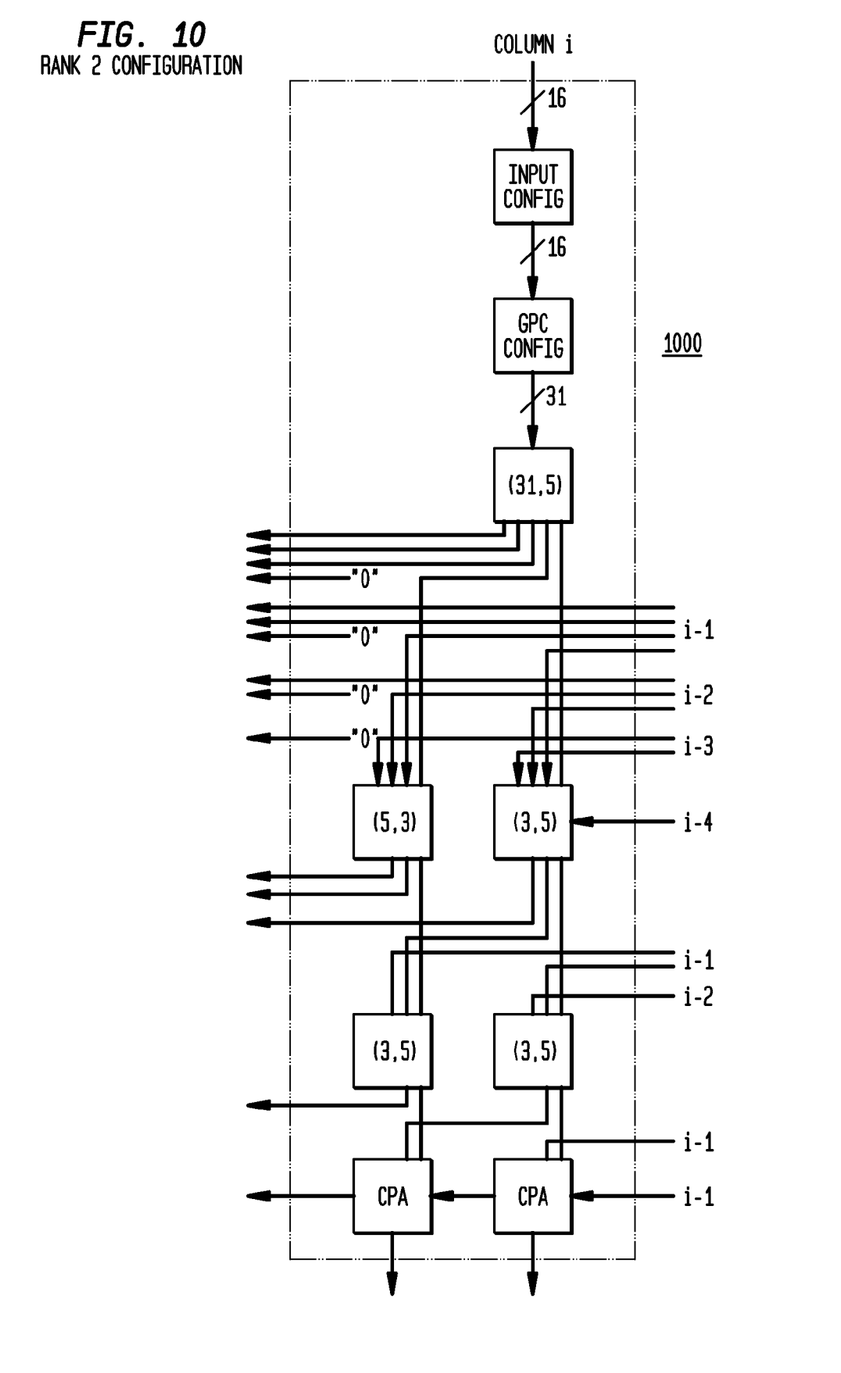
FIG. 10 is a schematic diagram illustrating an example of a CSlice which could be programmed to implement a rank 2 configuration according to an illustrative embodiment of the present invention.

A CSlice or p-CSlice designed to support output rank ranging from 0 to n, has the capability to be programmed to compute a number of output bits ranging from 1 to n. An output multiplexing stage (316 FIG. 3, 416 FIG. 4) is required to select the proper signal and forward it to the following slice (202 FIG. 2) according to the output rank. N memory bits are required to store the information related to the output rank. An example of a CSlice 900 which could be programmed to implement a rank 1 configuration is shown in FIG. 9. Another example of a CSlice 1000 which could be programmed to implement a rank 2 configuration is shown in FIG. 10. The Examples shown in FIG. 9 and FIG. 10 reveal that for each configuration, the number of signals propagated to the following CSlice is the same.

A single GPCA circuit (200 FIG. 2) must be able to map several multi-operand adders if required. This functionality can be achieved by inserting Chain Interrupt Configuration logic (313 FIG. 3, 414 FIG. 4) between slices (202 FIG. 2) to provide the capability to interrupt the Chain. This block is particularly useful if the input operands are signed.

Although the invention has been shown and described with respect to an exemplary embodiment thereof, it will be appreciated that the foregoing and various other changes, additions, and omissions in the form and detail thereof may be made therein without departing from the spirit and scope of the invention.

What is claimed is:

1. A device for adding single or multiple columns of multi-bit first operands, the device comprising:
    an input configuration circuit adapted to receive said multi-bit first operands and output multi-bit second operands by zeroing one or more selected bits of at least one of said multi-bit first operands regardless of value of said one or more selected bits to eliminate said one or more selected bits;
    a configurable general parallel counter adapted to receive, from the input configuration circuit, said multi-bit second operands and output multi-bit third operands by altering one or more bits of said multi-bit second operands to be interpreted as belonging to a different rank, said input configuration circuit and said configurable general parallel counter working together to effect a summation of a subset of multiple ranks and a subset of bits within said ranks;
    a plurality of parallel counters each receiving, from the configurable general parallel counter, one or more said multi-bit third operands, said parallel counters arranged to compress said multi-bit third operands into a pair of resulting operands; and an adder adapted to receive and sum said resulting operands from the plurality of parallel counters and provide an adder output, the adder output comprising a sum for said single or multiple columns of the multi-bit first operands.

2. The device of claim 1, further comprising:

an output multiplexer adapted to receive an output of one or more of said parallel counters; and configuration circuitry in communication with said output multiplexer, the configuration circuitry adapted to connect said device in a chain with other of said devices.

3. A system for simultaneously adding together multiple multi-bit operands comprising a chain of the devices of claim 2.

4. The device of claim 1, wherein said configurable general parallel counter includes configuration means to implement different general parallel counters within a fixed circuit.

5. The device of claim 1, wherein said input configuration circuit comprises:

combinational logic circuitry having a number p of input bits and p output bits; and a p-bit register including configuration bits ANDed by said combinational logic with respective input bits to select which of said p input bits will be included in said p output bits.

6. The device of claim 5 wherein said configurable general parallel counter comprises:

combinational logic circuitry having p input bits, a p-bit counter configuration register including counter configuration bits ANDed by said combinational logic with respective input bits to select or exclude a respective input bit in a particular column input to each of said parallel counters.

7. The device of claim 6 wherein each of said p output bits from said input configuration circuit is input directly into a general parallel counter to represent an nth rank input and is also combined in an AND gate with a respective counter configuration bit, wherein output from said AND gate is input as (n+1)th rank input to said general parallel counter, said configuration bit determining whether said output bit is counted in said (n+1)th rank.

8. The device of claim 6, further comprising:

an output multiplexer adapted to receive an output of one or more of said parallel counters; and configuration circuitry in communication with said output multiplexer, the configuration circuitry adapted to connect said device in a chain with other of said devices.

9. A system for simultaneously adding together multiple multi-bit operands comprising a chain of the devices of claim 8.

10. The device of claim 1, wherein said adder comprises a configurable carry-select adder.

11. The device of claim 1, further comprising:

a column of parallel counters for each rank of said sum, the column in communication with said adder output for receiving said sum, each column comprising a plurality of said counters having different sizes; and an output multiplexer in communication with said columns of parallel counters.

12. The device of claim 1, further comprising:

means for compressing a plurality of said sums to a desired number of bits; and means for chaining a plurality of said devices with other like devices.

13. A device for adding multiple columns of multi-bit operands, the device comprising:

means for effecting a summation of a subset of said multiple columns and a subset of bits within the columns comprising:

means for zeroing selected bits of at least one of said columns of multi-bit operands regardless of value of said selected bits to eliminate said selected bits; and means for selecting which bits of said columns of multi-bit operands are to be added by altering one or more bits of at least one of said columns of multi-bit operands to be interpreted as belonging to a different column;

means for compressing the summation of the subset of said multiple columns and the subset of bits within the columns into a pair of resulting operands; and means for receiving and summing said resulting operands and providing an adder output, the adder output comprising a sum for the subset of said multiple columns of said multi-bit operands.

14. The device of claim 13, comprising:

means for selecting the columns.

15. A method for adding multiple columns of multi-bit operands, the method comprising:

selecting columns of said multi-bit operands to be added;

enabling a summation of a subset of said multiple columns and a subset of bits within said selected columns, comprising:

providing configuration circuitry to selectively configure a plurality of parallel counters to combine only the selected columns; and zeroing selected bits of said selected columns regardless of value of said selected bits to eliminate said selected bits;

compressing the selected columns with the selected bits zeroed into a pair of resulting operands; and adding said resulting operands to generate a sum for the selected columns of the multi-bit operands.

16. The method of claim 15, wherein compressing the selected columns is performed by a plurality of parallel counters arranged in columns, each column corresponding to a desired output rank and comprising a plurality of counters of different size, the method further comprising:

multiplexing intermediate results from each counter in each column.

17. A device for simultaneously adding together multiple multi-bit operands, where said device consists of:

an array of reconfigurable Compressor Slices, each Compressor Slice configurable to:

selectively configure a plurality of parallel counters to combine selected columns, zero selected bits of said columns regardless of value of said selected bits to eliminate said selected bits and to enable a summation of said columns and a subset of bits within said columns, compress bits belonging to multiple columns, and produce one or more bits of a result, wherein each Compressor Slice comprises:

an input configuration circuit combining respective input bits with corresponding input configuration bits in a first combinational logic circuit, selectively configuring the plurality of parallel counters to combine selected columns by zero selected bits of said columns;

a configurable general parallel counter combining output bits from said first combinatorial logic circuit with corresponding counter configuration bits in a second combinatorial logic circuit to generate input to a plurality of columns; and the plurality of columns, each column including a compressor tree and a carry propagate adder, an output from the carry propagate adder being the sum for a respective column of the multiple multi-bit operands being added.

18. The device of claim 17, wherein each Compressor Slice further comprises an output multiplexer and chain interrupt configuration circuitry for connecting said Compressor Slices within said Array.

* * * * *